(12) United States Patent
Tsuruoka et al.

(10) Patent No.: US 8,953,805 B2
(45) Date of Patent: Feb. 10, 2015

(54) AUTHENTICATION INFORMATION GENERATING SYSTEM, AUTHENTICATION INFORMATION GENERATING METHOD, CLIENT APPARATUS, AND AUTHENTICATION INFORMATION GENERATING PROGRAM FOR IMPLEMENTING THE METHOD

(75) Inventors: Yukio Tsuruoka, Tokyo (JP); Yoshinao Kikuchi, Tokyo (JP); Tomoo Fukazawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 673 days.

(21) Appl. No.: 12/919,586

(22) PCT Filed: Mar. 3, 2009

(86) PCT No.: PCT/JP2009/053944
§ 371 (c)(1),
(2), (4) Date: Dec. 2, 2010

(87) PCT Pub. No.: WO2009/110457
PCT Pub. Date: Sep. 11, 2009

(65) Prior Publication Data
US 2011/0069839 A1 Mar. 24, 2011

(30) Foreign Application Priority Data
Mar. 4, 2008 (JP) ................... 2008-053817

(51) Int. Cl.
| | |
|---|---|
| *H04L 9/08* | (2006.01) |
| *G06F 21/62* | (2013.01) |
| *G06F 21/31* | (2013.01) |
| *H04L 29/06* | (2006.01) |
| *H04L 9/32* | (2006.01) |

(52) U.S. Cl.
CPC ............ *G06F 21/6245* (2013.01); *G06F 21/31* (2013.01); *H04L 63/08* (2013.01); *H04L 63/126* (2013.01); *H04L 9/3273* (2013.01); *G06F 2221/2115* (2013.01); *H04L 63/1441* (2013.01)
USPC ........................................ 380/279

(58) Field of Classification Search
CPC ..... G06F 21/31; G06F 21/6245; G06F 21/00; G06F 21/30; G06F 21/60; G06F 21/62; G06F 21/6218; G06F 2222/00; G06F 2221/21; H04L 9/3273; H04L 63/126; H04L 63/08; H04L 63/1441; H04L 9/00; H04L 9/32; H04L 9/3271; H04L 63/00; H04L 63/14
USPC .............................................. 380/279; 726/3
See application file for complete search history.

(56) References Cited

U.S. PATENT DOCUMENTS

| | | | |
|---|---|---|---|
| 5,761,309 A | 6/1998 | Ohashi et al. | |
| 7,231,517 B1* | 6/2007 | Mashayekhi | 713/167 |
| 2004/0162787 A1 | 8/2004 | Madison et al. | |
| 2006/0190987 A1 | 8/2006 | Ohta et al. | |
| 2008/0082817 A1* | 4/2008 | Takahashi et al. | 713/155 |
| 2009/0169012 A1* | 7/2009 | Smith et al. | 380/277 |
| 2010/0153749 A1* | 6/2010 | Sakai | 713/193 |

FOREIGN PATENT DOCUMENTS

| | | |
|---|---|---|
| EP | 0 727 894 A1 | 8/1996 |
| EP | 1 689 145 A1 | 8/2006 |
| JP | 5 333775 | 12/1993 |
| JP | 2006 120089 | 5/2006 |
| JP | 2006 244469 | 9/2006 |
| JP | 2007 323235 | 12/2007 |

OTHER PUBLICATIONS

Japanese Office Action issued Feb. 28, 2012, in Patent Application No. 2008-053817 (with English-language translation).

Extended European Search Report issued on Dec. 8, 2011 in the corresponding European Application No. 09717104.5.

Ohta, Ken et al., "Confidentiality Separation and Monitoring for Mobile Applications", Transaction of Information Processing Society of Japan, vol. 47, No. 7, pp. 2125 to 2132, (Jul. 15, 2006). (with English abstract).

"Certificate Stores" [online], Microsoft Corp., [retrieved on Feb. 18, 2008], Internet<URL:http://technet2.microsoft.com/WindowsServer/ja/library/1c4d3c02-e996-450a-bf4f-9a12d245a7eb1041.mspx? pp. 1-3, in Japanese and English.

European Office Action dated Jun. 24, 2013, for corresponding European Patent Application N. 09 717 104.5.

* cited by examiner

*Primary Examiner* — William Goodchild

(74) *Attorney, Agent, or Firm* — Oblon, Spivak, McCelland, Maier & Neustadt, L.L.P.

(57) ABSTRACT

A secret information server 300 on a network 10 and a client apparatus 100 constitute an authentication information generating system. The secret information server 300 has a function to confirm the validity of a user in accordance with user identification information received from the client apparatus 100 and a function to hold the secret information database of each user and to send the secret information database of a user whose validity has been confirmed to the client apparatus 100 of the user. The client apparatus 100 has a main memory 120 having a domain A where an application or a main OS is executed and a domain B which has a program execution environment mutually independent of that for the domain A. The secret information database received from the secret information server 300 is saved in the domain B, and authentication information is generated by using the secret information database. Secret information required to generate the authentication information for user authentication is held securely at low cost.

6 Claims, 11 Drawing Sheets

AUTHENTICATION INFORMATION GENERATING SYSTEM, AUTHENTICATION INFORMATION GENERATING METHOD, CLIENT APPARATUS, AND AUTHENTICATION INFORMATION GENERATING PROGRAM FOR IMPLEMENTING THE METHOD

TECHNICAL FIELD

The present invention relates to a system and method for generating authentication information to be sent to a service providing apparatus for the purpose of user authentication when a user receives a service requiring authentication from the service providing apparatus in a system where a client apparatus and the service providing apparatus are connected through a network.

BACKGROUND ART

As the use of the Internet has become widespread, the number of online services such as online shopping and content services has been increasing. In a usual online service, a service providing apparatus for providing a service for the user and a client apparatus for performing user authentication for the service providing apparatus are connected to a network. The user needs user authentication for the service providing apparatus through the client apparatus, and the service providing apparatus provides a service for the user in accordance with the result of the user authentication.

Some user authentication methods are based on a password or cryptography. For the password-based authentication, the user must memorize his or her password. If the user uses many services, it would be difficult for the user to memorize all the passwords. To help the user, browsers and other application programs on the client apparatus have functions to store the passwords and to send a required one on behalf of the user at authentication.

Because of its high level of security against impersonation, cryptography-based authentication is suitable for authentication for high-value services. The cryptography-based authentication requires safe retention of secret information, such as the keys used in a cryptography operation.

In both password-based authentication and cryptography-based authentication, some secret information for authentication is generally held in the client apparatus. Means for retaining the secret information are classified roughly into software means and hardware means.

Software means for retaining the secret information includes a key store (refer to non-patent literature 1, for example) provided by the OS. Hardware means for retaining the secret information includes external devices attached to the client apparatus, such as a cryptographic token or a smart card.

Non-patent literature 1: "Certificate Store" [online], Microsoft Corp., [retrieved on Feb. 18, 2008].

DISCLOSURE OF THE INVENTION

Problems to be Solved by the Invention

The software means for retaining the secret information involves the risk that the secret information would be surreptitiously read by a malicious program. Malicious programs include viruses and bots that obtain a privilege unfairly by using a vulnerability of the OS, for example.

The hardware means for retaining the secret information does not allow any malicious program to read a key, for example. Because of the high production cost of the external device or the high cost of distribution to the users, however, the hardware means can be used only for expensive, high-value-added services.

Unfortunately, the conventional secret information retention means such as the key store of the OS and external devices cannot provide both a high level of security and low cost.

An object of the present invention is to solve the problems described above by providing an authentication information generating system, an authentication information generating method, and a client apparatus that can securely retain user's secret information that is needed to generate authentication information for user authentication, at low cost.

Means to Solve the Problems

According to one aspect of the present invention, in an authentication information generating system or method of generating authentication information to be sent to a service providing apparatus on a network for user authentication, a client apparatus used by a user sends user identification information to a secret information server on the network;
  the secret information server confirms the validity of the user in accordance with the received user identification information and sends a secret information database of a user whose validity has been confirmed to the client apparatus of the user; and
  the client apparatus saves the received secret information database in a domain B of a main memory, which has a program execution environment mutually independent of that for a domain A of the main memory, where an application execution or a main OS is executed, and generates the authentication information by using the secret information database.

According to a second aspect of the present invention, in an authentication information generating system or method of generating authentication information to be sent to a service providing apparatus on a network for user authentication, a client apparatus used by a user sends user identification information to a secret information server on the network;
  the secret information server confirms the validity of the user in accordance with the received user identification information and sends a secret information database decryption key of a user whose validity has been confirmed to the client apparatus of the user;
  the client apparatus decrypts an encrypted secret information database stored in a secondary memory by using the received secret information database decryption key, saves the secret information database in a domain B of a main memory, which has a program execution environment mutually independent of that for a domain A of the main memory, where an application or a main OS is executed, and erases the secret information database decryption key; and
  the client apparatus generates the authentication information by using the saved secret information database in the domain B.

According to a third aspect of the present invention, in an authentication information generating system or method of generating authentication information to be sent to a service providing apparatus on a network for user authentication, a client apparatus used by a user sends user identification information to a secret information server on the network;

the secret information server confirms the validity of the user in accordance with the received user identification information and sends to the client apparatus of a user whose validity has been confirmed, the encrypted secret information database of the user and the encrypted secret information database decryption key of the client apparatus;

the client apparatus decrypts the encrypted secret information database decryption key, received from the secret information server, by using a key specific to the client apparatus, stored in a secret information management unit which has a program execution environment mutually independent of that for a main memory, decrypts the encrypted secret information database, received from the secret information server, by using the secret information database decryption key, saves the secret information database in a domain B of the main memory, which has a program execution environment mutually independent of that for a domain A of the main memory, where an application or a main OS is executed, and erases the secret information database decryption key and the encrypted secret information database decryption key; and the client apparatus generates the authentication information by using the saved secret information database in the domain B.

According to a fourth aspect of the present invention, in a client apparatus for generating authentication information to be sent to a service providing apparatus on a network for user authentication or in an authentication information generating method for the client apparatus, a main memory sends user identification information to a secret information management unit having a program execution environment mutually independent of that for the main memory;

the secret information management unit confirms the validity of a user in accordance with the received user identification information and sends a secret information database of the user to the main memory when the validity is confirmed; and the main memory saves the received secret information database in a domain B having a program execution environment mutually independent of that for a domain A where an application or a main OS is executed, and generates the authentication information by using the secret information database.

Effects of the Invention

According to the present invention, since the authentication processor is executed to generate the authentication information in the environment independent of that for an application or a main OS, in the client apparatus, the secret information necessary for generating the authentication information can be prevented from being surreptitiously read by a malicious program infecting through the application. In addition, unlike conventional systems which require an external device as secret information retention means, an external device is not required. Therefore, both a high level of security and low cost are provided in secret information retention.

DESCRIPTION OF EMBODIMENTS

Embodiments of the present invention will be described below.

First Embodiment

Figure 1:
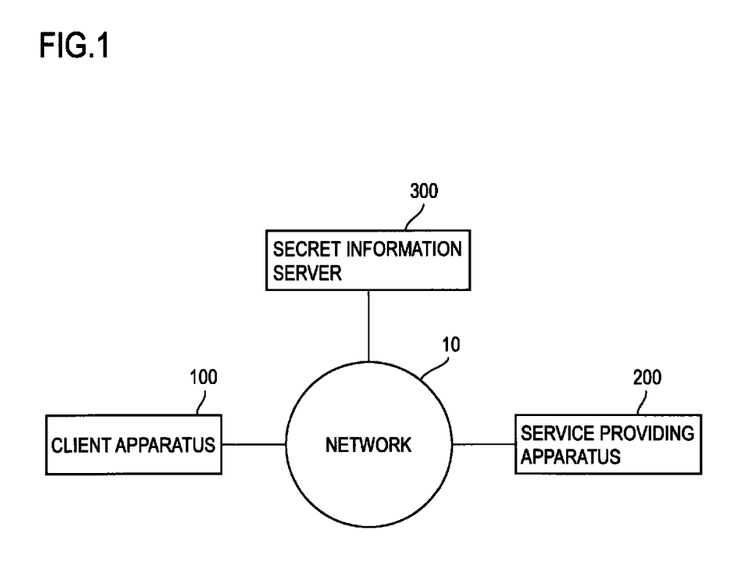
FIG. 1 is a view showing the structure of an authentication information generating system according to a first embodiment of the present invention.

FIG. 1 is a view illustrating an authentication information generating system of a first embodiment of the present invention. A client apparatus 100 and a service providing apparatus 200 are mutually connected via a network 10, and a secret information server 300 is provided on the network 10. In the first embodiment, the secret information server 300 and the client apparatus 100 used by the user constitute the authentication information generating system.

Figure 2:
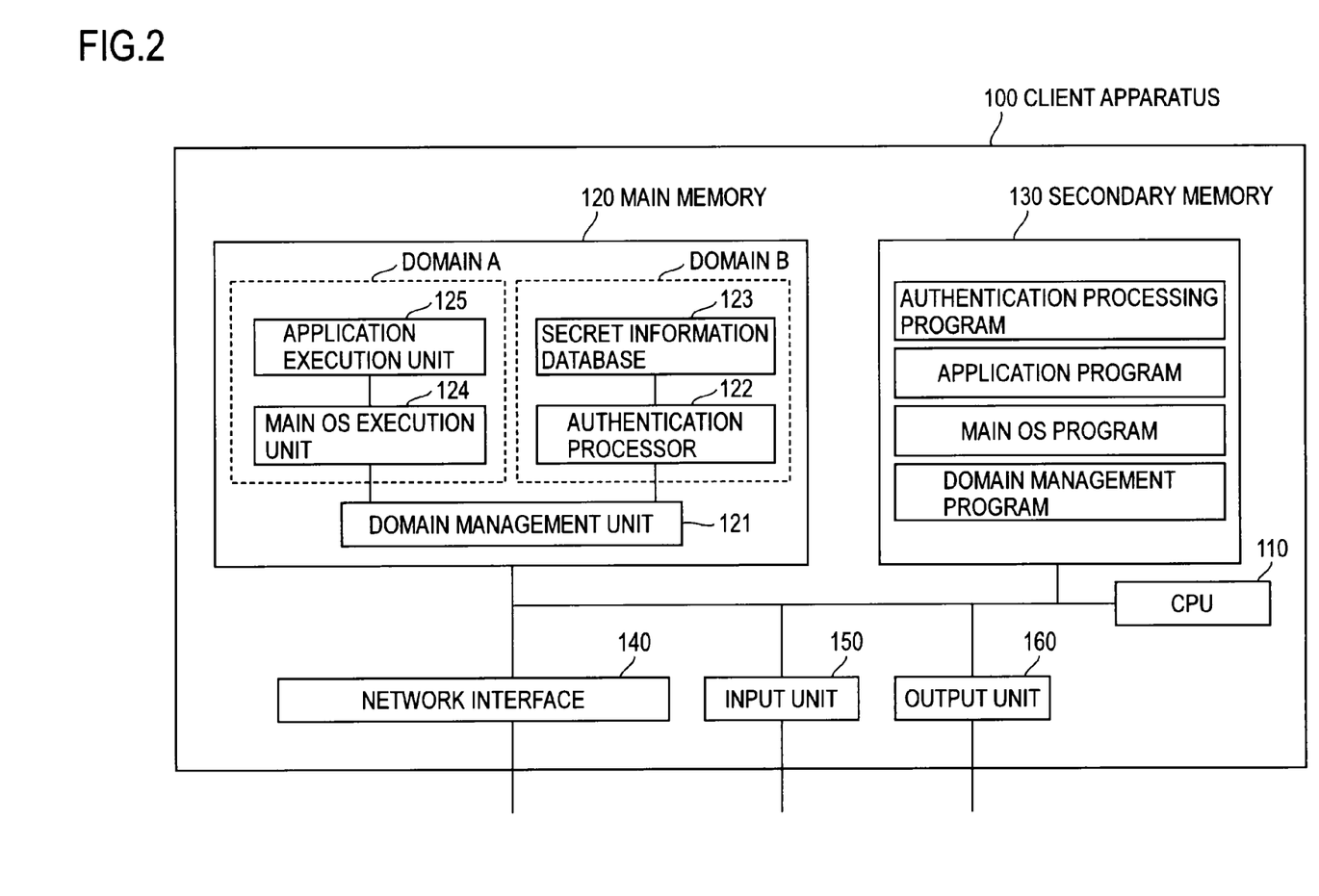
FIG. 2 is a view showing the structure of a client apparatus shown in FIG. 1.

FIG. 2 shows the structure of the client apparatus 100. With reference to FIG. 2, the structure of the client apparatus 100 will be described next.

The client apparatus 100 includes a CPU 110 for executing a program, a main memory 120 into which the program to be executed is loaded, a secondary memory 130 for storing the program to be loaded into the main memory 120, a network interface 140 for allowing communication with the service providing apparatus 200 and the secret information server 300, an input unit 150 for allowing the user to input information, and an output unit 160 for outputting information to the user.

The main memory 120 includes a domain management unit 121 for managing a plurality of mutually independent program execution environments. A domain A and a domain B are generated on the main memory 120 as managed by the domain management unit 121. The domain here represents a logically-independent program execution environment. More specifically, the domains A and B are such partitions of a component in the main memory 120 that program execution or input-output operation in the domain A does not affect program execution or input-output operation in the domain B, and vice versa. For example, a virtual machine monitor program is an example of the domain management unit 121, and a virtual machine managed by the virtual machine monitor program is an example of the domain.

In the domain A, an application execution unit 125 executes an application. A main OS execution unit 124 executes the main OS for executing an application. In the domain B, a secret information database 123 is provided, and an authentication processor 122 executes authentication processing for generating authentication information needed in authentication by using secret information Ki (i=1, 2, ...) included in the secret information database 123. Here, Ki (i=1, 2, ...) represents secret information corresponding to each of a plurality of services.

The secondary memory 130 stores programs needed to operate the domain management unit 121, the main OS execution unit 124, the application execution unit 125, and the authentication processor 122, which are a domain management program, a main OS program, an application program, and an authentication processing program, respectively. The input unit 150 is a keyboard or a pointing device such as a mouse, for example. The output unit 160 is a CRT or a liquid crystal display, for example.

The structure of the secret information server 300 will be described next with reference to FIG. 3.

The secret information server 300 includes a network interface 310, a user checking unit 320, and a secret information management unit 330. The network interface 310 performs communication with the client apparatus 100. The user checking unit 320 checks the validity of the user in accordance with user identification information sent from the client apparatus 100. The secret information management unit 330 holds the secret information database of each user, so that the secret information database of a user whose validity has been confirmed can be sent to the client apparatus 100 of the user.

The service providing apparatus 200 is a usual web server apparatus or the like, and a description of its structure will be omitted.

With the structure as described above, the client apparatus 100 generates authentication information by using the secret information Ki (i=1, 2, ...) corresponding to each service and sends the authentication information to the service providing apparatus 200, thereby allowing user authentication to be executed.

A plurality of services may be provided by a plurality of service providing apparatuses 200.

The secret information server 300 confirms the user identification information received from the client apparatus 100 and, in accordance with the result, sends the secret information database, which is a set of secret information Ki (i=1, 2, ...) needed to generate authentication information, to the client apparatus 100.

The service providing apparatus 200 executes user authentication on the basis of the authentication information sent from the client apparatus 100 and, if the authentication is successfully completed, provides the service for the authenticated user.

Figure 4:
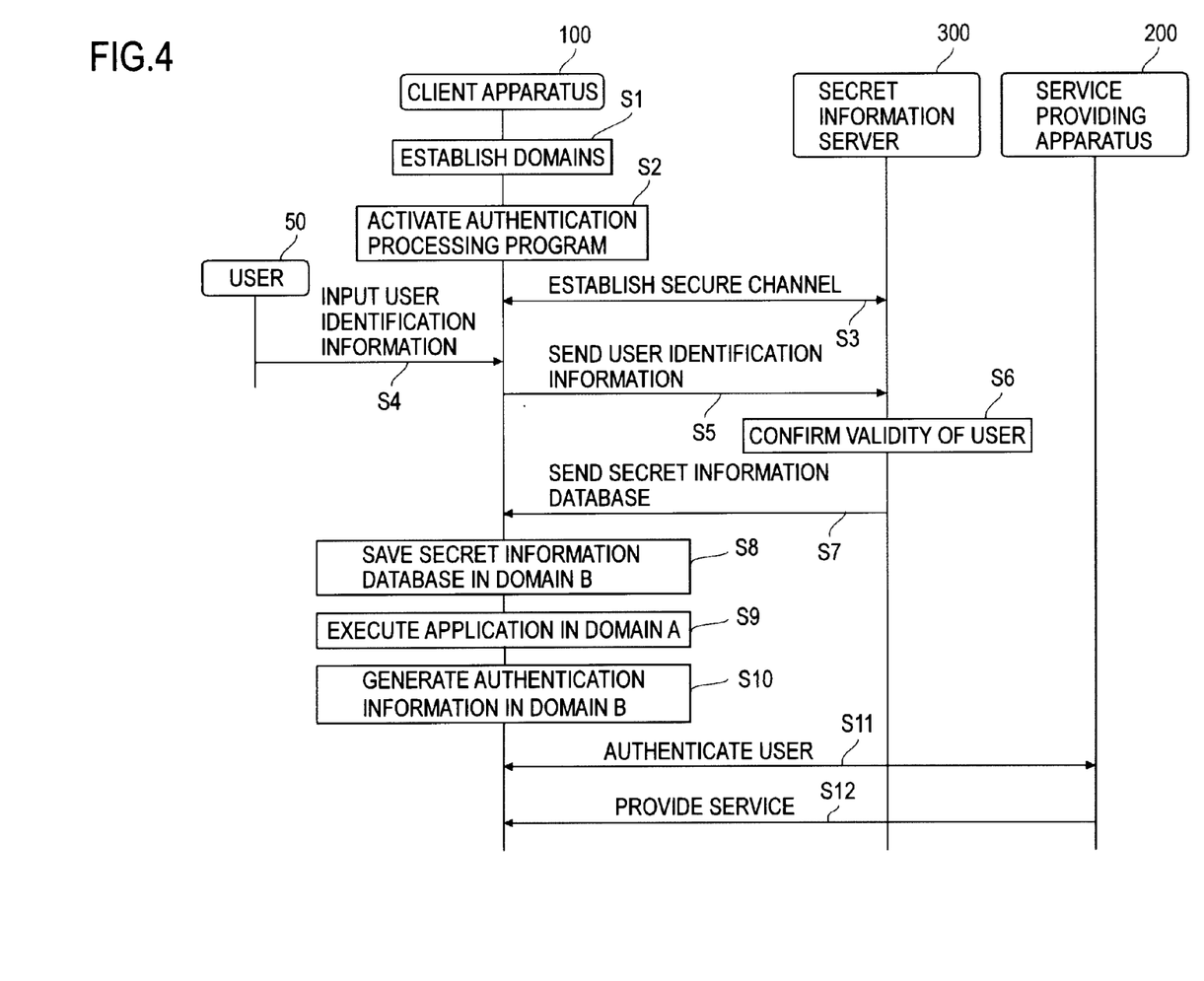
FIG. 4 is a sequence diagram showing the operation procedure of the authentication information generating system according to the first embodiment of the present invention.

With reference to FIG. 4, an operating procedure of the authentication information generating system of the first embodiment of the present invention will be described.

The CPU 110 of the client apparatus 100 operates the domain management unit 121 to generate (establish) domains A and B (step S1). The CPU 110 activates the authentication processing program (step S2). In the domain B, the CPU 110 operates the authentication processor 122 to perform the following processing.

A secure channel is established between the authentication processor 122 and the secret information server 300 through the network interface 140 (step S3). When the user inputs user identification information through the input unit 150 (step S4), the input user identification information is sent through the secure channel to the secret information server 300 (step S5). The user identification information here is, for example, a secret code number for identifying the user. The establishment of the secure channel includes the sharing of a session key for encryption of a communication message sent or received through the channel and for message authentication. The secure channel is established at least when the secret information server 300 has been authenticated.

The secret information server 300 confirms the validity of the received user identification information (step S6) and, only when the validity is confirmed, sends the secret information database of the user to the client apparatus 100 through the secure channel (step S7).

The client apparatus 100 receives the secret information database sent from the secret information server 300 and saves it as the secret information database 123 in the domain B of the main memory 120 (step S8).

The CPU 110 of the client apparatus 100 operates the application execution unit 125 in the domain A (step S9). When the application requires user authentication for the service providing apparatus 200, the following processing is performed. At the request of the application execution unit 125, the authentication processor 122 in the domain B generates authentication information needed for user authentication by using the secret information Ki included in the secret information database 123 (step S10).

The authentication information is generated as described above and is sent through the network interface 140 to the service providing apparatus 200. The service providing apparatus 200 authenticates the user by using the authentication information sent from the client apparatus 100 (step S11) and, when the authentication is completed successfully, provides the service for the user (step S12). The authentication information generated by the authentication processor 122 may be sent through the application execution unit 125 and the network interface 140 to the service providing apparatus 200.

The CPU 110 may be programmed to erase all the contents of the secret information database 123 after the provision of the service for the user is completed.

If the execution by the application execution unit 125 or the like causes a modification to the secret information database 123, the modification is sent through the secure channel to the secret information server 300.

Steps S2 to S8 described above are executed upon activation of the client apparatus 100, for example, immediately after step S1, but the steps may also be executed immediately before the application is executed (step S9). The main OS executed in the domain A is activated at a given timing in the range from steps S1 and S9 and executed by the CPU 110.

The secret information server 300 may authenticate the client apparatus 100 (apparatus authentication) when the secure channel is established in step S3. A secret key for apparatus authentication, which is not shown in the figure, may be used for the apparatus authentication. In step S3, the secure channel may be established when the client apparatus 100 is connected to the network 10. In that case, the network access server connected to the client apparatus 100 becomes the secret information server 300, and the secure channel is established in step S3 in accordance with authentication at the connection of the client apparatus 100 to the network. Authentication at the connection to the network may be performed separately by using a secret key for network connection authentication, which is not shown in the figure.

In step S4, the user identification information is input from the input unit 150 of the client apparatus 100 to the authentication processor 122 in the domain B of the main memory 120. This processing is executed by a function of the domain management unit 121 independently of the components in the domain A, without mutual interference. More specifically, the processing is implemented by virtualization of I/O, for example. Step S4 has been explained as a way to confirm the user operating the client apparatus 100, in the description of input of the user identification information such as a secret code number, but the processing may be executed with an existing way of individual confirmation, such as biometric authentication, including fingerprint authentication.

User authentication performed in step S11 uses challenge-response authentication using the public key cryptosystem, but other existing systems, such as password authentication, may be used. The secret information included in the secret information database which the client apparatus 100 receives from the secret information server 300 in step S7 is an item provided for each service that requires authentication, such as a secret key of the public key cryptosystem or a password.

As has been described above, in the authentication information generating system according to the first embodiment of the present invention, user's secret information that is required to generate authentication information for user authentication is held in the secret information server 300 and, when the validity of the user is confirmed, is sent to the client apparatus 100 of the user in accordance with the user identification information. In the client apparatus 100, the authentication processor 122 operates in an environment independent of the application or main OS to generate authentication information.

The secret information necessary for authentication can be protected from fraudulent reading by a malicious program intruding through an application, for example. Even if the client apparatus 100 is stolen, the secret information will not be leaked immediately. Therefore, the secret information can be retained more securely. Further, because no external device is used, a high level of security can be provided at a low cost. Since the secret information is managed by the secret information server 300, it can be restored easily in the event that the client apparatus 100 is lost. It is also easy for a plurality of client apparatuses to use the secret information together.

Second Embodiment

An authentication information generating system according to a second embodiment of the present invention will be described next with reference to FIGS. 5 to 7. Elements and steps identical to those in the authentication information generating system according to the first embodiment described earlier will be indicated by like reference characters, and a description of them will be omitted.

Figure 5:
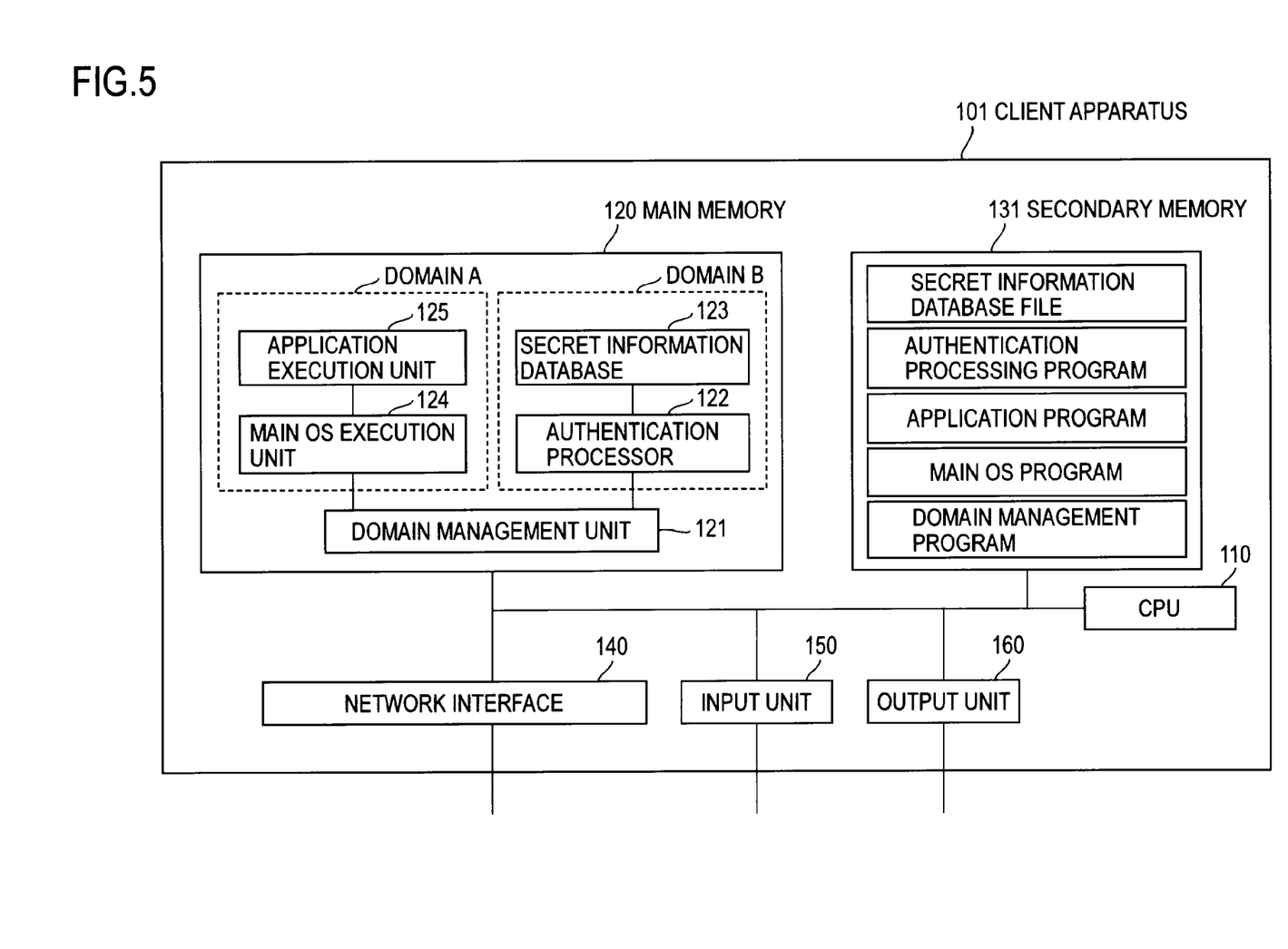
FIG. 5 is a view showing the structure of a client apparatus in an authentication information generating system according to a second embodiment of the present invention.

FIG. 5 shows the structure of a client apparatus 101 in the second embodiment. The client apparatus 101 differs from the client apparatus 100 of the first embodiment shown in FIG. 2 in the structure of a secondary memory 131. The secondary memory 131 includes a secret information database file in addition to the structure of the secondary memory 130 in the first embodiment. The secret information database file is obtained by encrypting a secret information database by using a given key.

Figure 6:
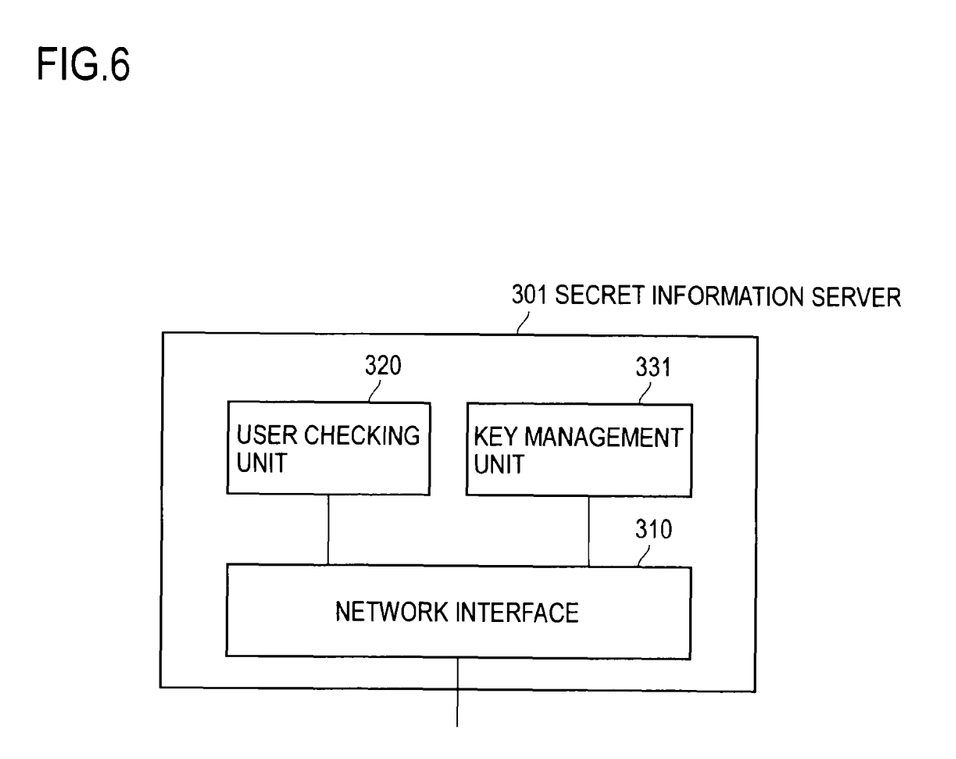
FIG. 6 is a view showing the structure of a secret information server in the authentication information generating system according to the second embodiment of the present invention.
Figure 7:
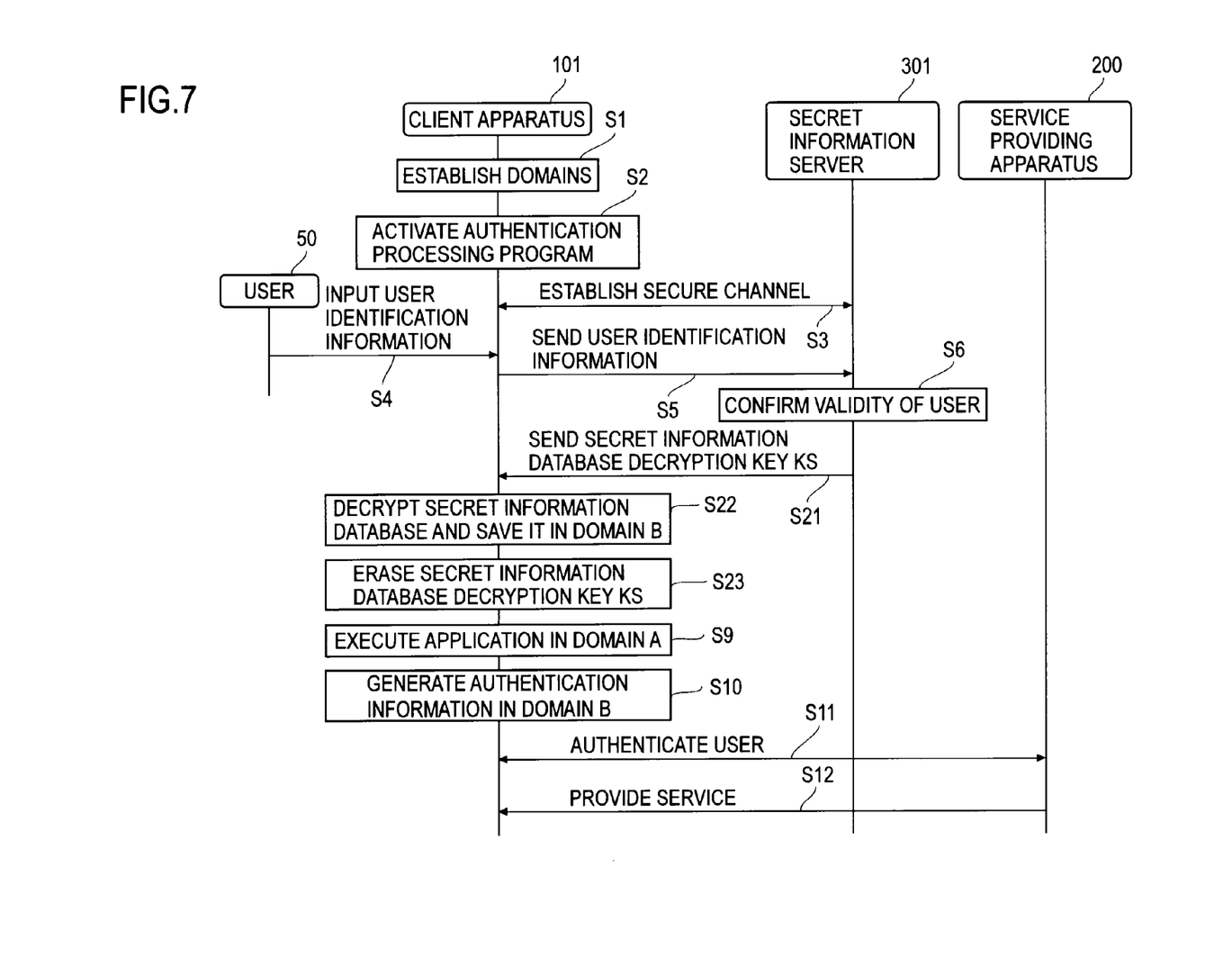
FIG. 7 is a sequence diagram showing the operation procedure of the authentication information generating system according to the second embodiment of the present invention.

FIG. 6 shows the structure of a secret information server 301. The secret information server 301 includes a key management unit 331 instead of the secret information management unit 330 included in the secret information server 300 of the first embodiment shown in FIG. 3. The key management unit 331 holds a secret information database decryption key KS for use in decryption of the secret information database from the secret information database file in the secondary memory 131 of the client apparatus 101.

The operating procedure of the authentication information generating system of the second embodiment of the present invention will be described next with reference to FIG. 7.

In the second embodiment, the secret information server 301 confirms in step S6 the validity of user identification information received from the client apparatus 101 and, only when the validity is confirmed, sends the secret information database decryption key KS of the user to the client apparatus 101 (step S21). The client apparatus 101 receives the secret information database decryption key KS, decrypts the secret information database file stored in the secondary memory 131 by using the received secret information database decryption key KS, and saves the result as a secret information database 123 in the domain B of the main memory 120 (step S22). After the save operation, the secret information database decryption key KS is erased (step S23). As in the first embodiment shown in FIG. 4, steps S9 and S10 are then executed to generate authentication information necessary for user authentication, and user authentication (step S11) and service provision (step S12) are executed.

Steps S2 to S6 and S21 to S23 are executed upon activation of the client apparatus 101, for example, immediately after step S1, but the steps may be executed immediately before the application is executed (step S9). The main OS executed in the domain A is activated at a given timing in the range from steps S1 to S9 and executed by the CPU 110.

In the authentication information generating system according to the second embodiment described above, the secret information is stored in the secondary memory 131 not as plaintext but in an encrypted form, is decrypted as required by using the decryption key KS obtained from the secret information server 301 when the user inputs the user identification information, is saved in the domain B of the main memory 120, and is provided for the authentication processor 122 temporarily. Accordingly, the secret information necessary for authentication can be protected from fraudulent reading by a malicious program. Even if the client apparatus 101 is stolen, the secret information will not be leaked immediately.

In the second embodiment, it is not necessary that the whole secret information database be downloaded upon activation of the client apparatus 101; just the key for decrypting the secret information database file held on the secondary memory 131 must be downloaded. Accordingly, if the secret information database is large, the download time can be reduced. Unlike the first embodiment, the secret information database is not saved in the secret information server 301, so that the secret information database can be kept secret from the secret information server.

Third Embodiment

A third embodiment of the present invention will be described with reference to FIGS. 8 to 10. Elements and steps identical to those in the first embodiment described above will be indicated by like reference characters, and a description of them will be omitted.

Figure 8:
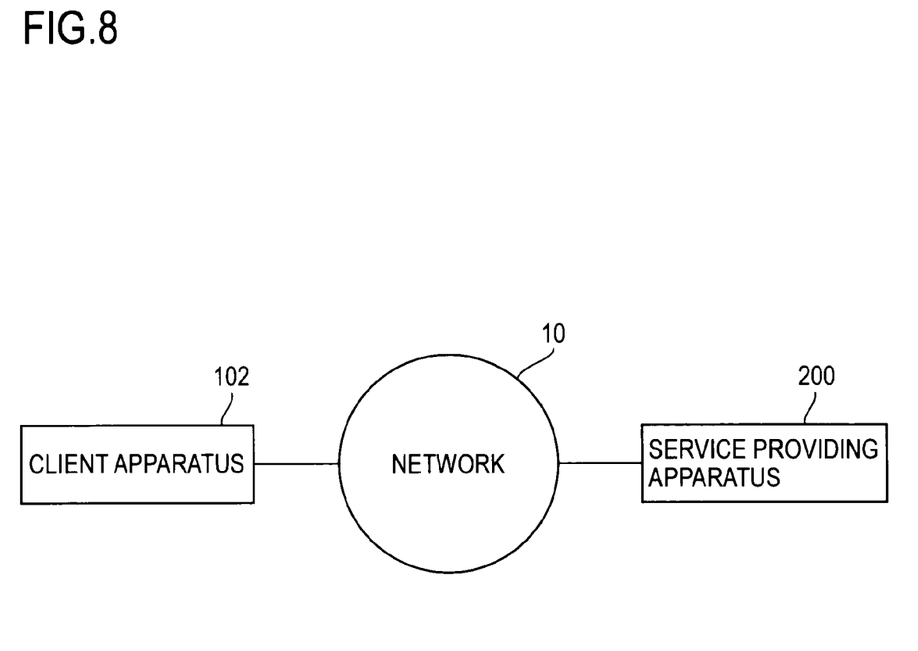
FIG. 8 is a view showing the structure of an authentication information generating system according to a third embodiment of the present invention.

FIG. 8 is a view illustrating the third embodiment. The system structure in the third embodiment differs from the structure shown in FIG. 1 in that the secret information server 300 is not present. A client apparatus 102 is provided instead of the client apparatus 100 shown in FIG. 1.

Figure 9:
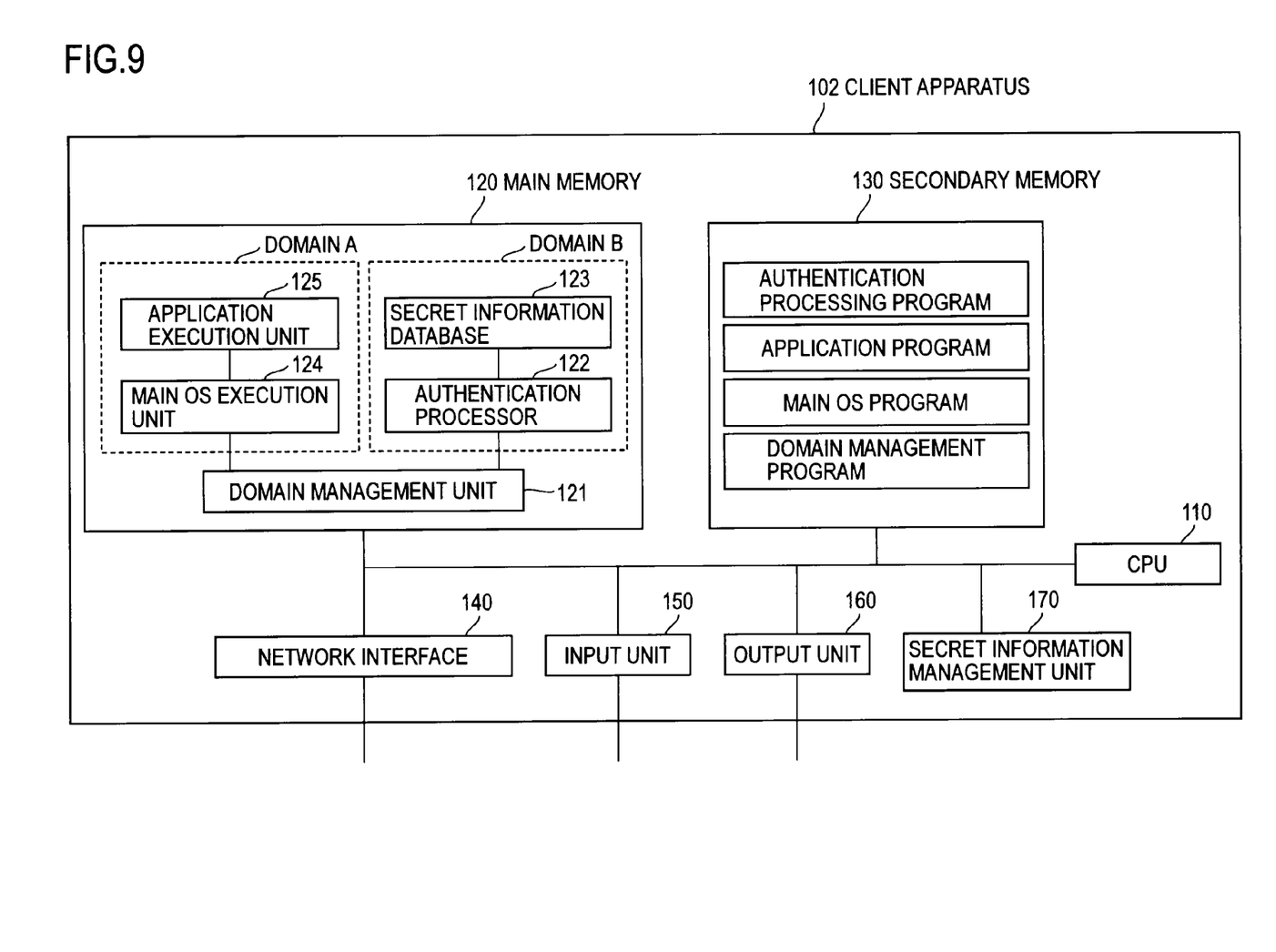
FIG. 9 is a view showing the structure of a client apparatus shown in FIG. 8.

FIG. 9 shows the structure of the client apparatus 102. The client apparatus 102 includes a secret information management unit 170 in addition to the structure of the client apparatus 100 of the first embodiment shown in FIG. 2.

The secret information management unit 170 has a program execution environment mutually independent of that for the main memory 120, has a function to confirm the validity of the user in accordance with user identification information sent from the main memory 120, and holds a user's secret information database to be sent to the main memory 120 when the validity of the user is confirmed.

Figure 10:
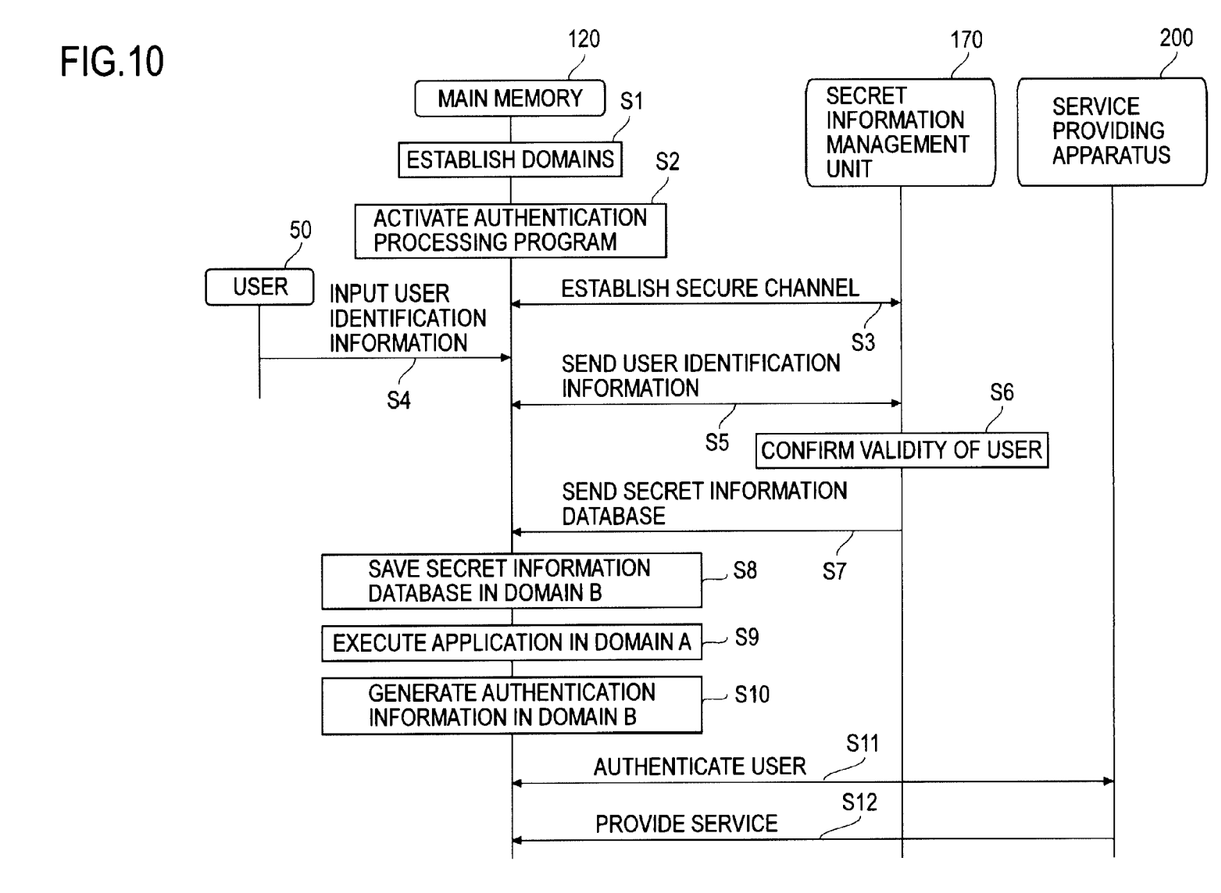
FIG. 10 is a sequence diagram showing the operation procedure of the client apparatus shown in FIG. 9.

As shown in FIG. 10, the operating procedure in the third embodiment of the present invention is the same as the operating procedure in the first embodiment shown in FIG. 4, except that the element that communicates with the main memory 120 of the client apparatus 102 and obtains the secret information database is not the secret information server 300 but the secret information management unit 170 of the client apparatus 102. With the structure and procedure as described above, the secret information database can be saved in a domain B of the main memory 120 without communication with the secret information server 300, in the third embodiment.

Communication between an authentication processor 122 in the main memory 120 and the secret information management unit 170 through a secure channel established in step S3 is performed under the control of a domain management unit 121 and is executed independently of the components in a domain A without mutual interference. More specifically, the communication is implemented by virtualization of I/O, for example.

The client apparatus 102 and the generation of authentication information in the client apparatus 102 described above can be implemented, for example, by a computer and an authentication information generating program installed in the computer, respectively. The authentication information generating program can be recorded on a computer-readable recording medium.

Fourth Embodiment

A fourth embodiment of the present invention will be described next.

Like the system structure of the first embodiment shown in FIG. 1, an authentication information generating system in the fourth embodiment includes a secret information server 300 on a network and a client apparatus 102 used by the user.

The structure of the client apparatus 102 is the same as the structure of the client apparatus 102 in the third embodiment shown in FIG. 9. The secret information management unit 170 of the client apparatus 102 in the fourth embodiment stores a key KSj (j=1, 2, ...) specific to the client apparatus 102.

Figure 3:
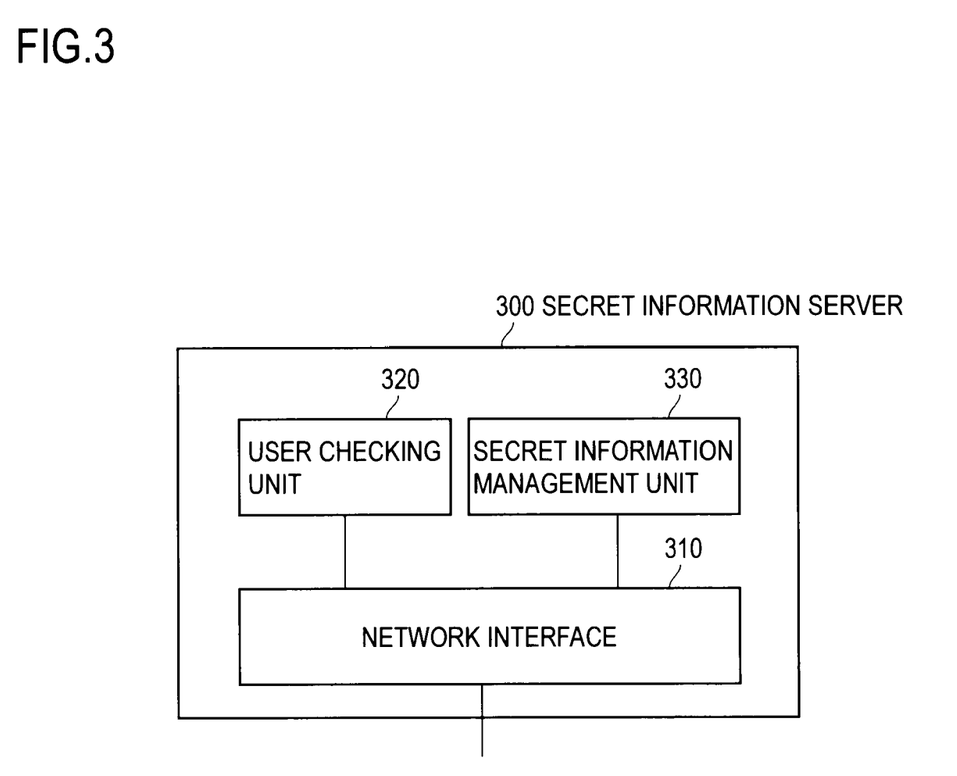
FIG. 3 is a view showing the structure of a secret information server shown in FIG. 1.

The structure of the secret information server 300 is the same as the structure of the secret information server 300 of the first embodiment shown in FIG. 3. A secret information management unit 330 of the secret information server 300 in the fourth embodiment stores information (K') obtained by encrypting the secret information database of each user with a given key and information (KSj') obtained by encrypting a secret information database decryption key KS with a given key.

The information K' is identical to the information stored in the secret information database file in the secondary memory 131 in the second embodiment. The secret information database can be obtained by decrypting the information by using the secret information database decryption key KS. The secret information database decryption key KS can be obtained by decrypting the information KSj' by using the key KSj.

Figure 11:
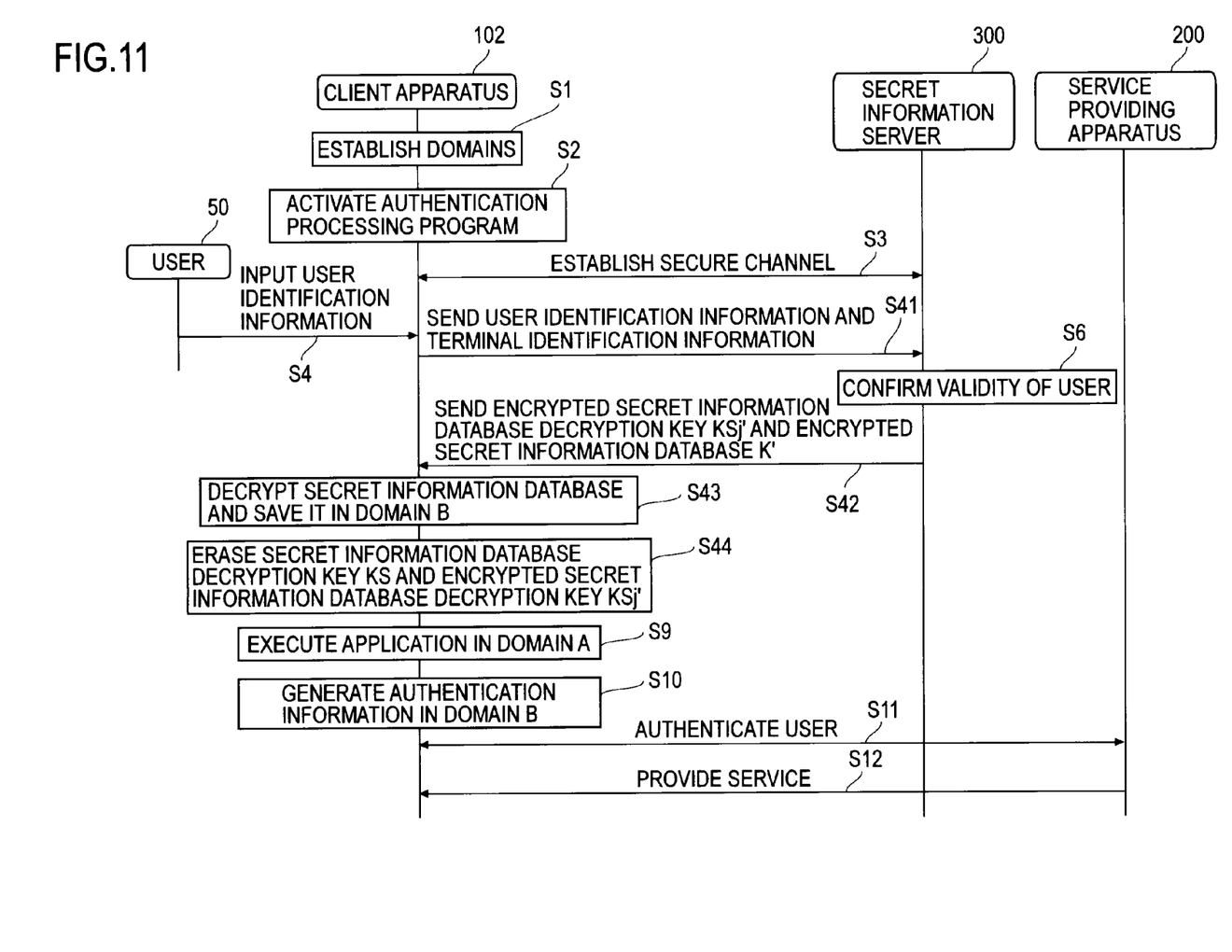
FIG. 11 is a sequence diagram showing the operation procedure of an authentication information generating system according to a fourth embodiment of the present invention.

The operating procedure of the authentication information generating system according to the fourth embodiment of the present invention will be described next with reference to FIG. 11. The operating procedure in the fourth embodiment is the same as the operating procedure in the second embodiment shown in FIG. 7, except for the following points.

In step S41, besides user identification information, terminal identification information is sent to the secret information server 300. The terminal identification information is information for identifying the client apparatus 102. If the client apparatus 102 is authenticated upon establishment of a secure channel in step S3, the result of authentication can replace the terminal identification information.

In step S42, an encrypted secret information database (K') corresponding to the user whose validity has been confirmed in step S6 and an encrypted secret information database decryption key KSj' corresponding to the client apparatus 102 identified in step S41 (or step S3) are sent to the client apparatus 102.

In step S43, the encrypted secret information database decryption key KSj' is decrypted by using the key KSj specific to the client apparatus 102, read from the secret information management unit 170 of the client apparatus 102 to obtain a secret information database decryption key KS. Further, the encrypted secret information database (K') is decrypted by using the secret information database decryption key KS to obtain a secret information database. The database is saved as a secret information database 123 in a domain B of a main memory 120.

After the save operation, the secret information database decryption key KS and the encrypted secret information database decryption key KSj' are erased in step S44.

The encrypted secret information database decryption key KSj' is prepared for the secret information database and the secret information database decryption key KS provided for each user and prepared for the corresponding client apparatus 102.

Since the key KSj required to decrypt the encrypted secret information database (K') is stored in the client apparatus 102, the secret information server 300 cannot know the contents of the secret information database. A plurality of client apparatuses 102 can share the secret information database and can use it as a mutual backup.

Accordingly, the system of the fourth embodiment has the features of the first embodiment and the second embodiment in that it can keep information secret from the secret information server 300 and a plurality of client apparatuses can share the secret information database and can use it as a mutual backup.

What is claimed is:

1. An authentication information generating system for generating authentication information to be sent to a service providing apparatus on a network for user authentication, the system comprising:
   a secret information server on the network; and
   a client apparatus used by each user;
   the secret information server having a function to confirm the validity of the user in accordance with user identification information received from the client apparatus and a function to hold a secret information database decryption key of the user and to send the secret information database decryption key of the user whose validity has been confirmed to the client apparatus of the user;

the client apparatus comprising:

a main memory having a domain A where an application or a main OS is executed and a domain B which has a program execution environment mutually independent of that for the domain A; and a secondary memory having stored an encrypted secret information database encrypted by using a given key;

the client apparatus decrypting the encrypted secret information database stored in the secondary memory by using the secret information database decryption key received from the secret information server, saving the secret information database in the domain B, and erasing the secret information database decryption key;

the secret information database saved in the domain B being used to generate the authentication information, wherein the secret information server does not store the decrypted secret information database.

2. An authentication information generating system for generating authentication information to be sent to a service providing apparatus on a network for user authentication, the system comprising:

a secret information server on the network; and a client apparatus used by each user;

the secret information server having a function to confirm the validity of the user in accordance with user identification information received from the client apparatus and a function to hold an encrypted secret information database of the user, encrypted with a given key, and an encrypted secret information database decryption key of each client apparatus, encrypted with a given key, and to send to the client apparatus of the user whose validity has been confirmed, the encrypted secret information database of the user and the encrypted secret information database decryption key of the client apparatus;

the client apparatus comprising:

a main memory having a domain A where an application or a main OS is executed and a domain B which has a program execution environment mutually independent of that for the domain A; and a secret information management unit having a program execution environment mutually independent of that for the main memory;

the secret information management unit storing a key specific to the client apparatus;

the client apparatus decrypting the encrypted secret information database decryption key, received from the secret information server, by using the key stored in the secret information management unit; decrypting the encrypted secret information database, received from the secret information server, by using the secret information database decryption key; saving the secret information database in the domain B; and erasing the secret information database decryption key and the encrypted secret information database decryption key;

the secret information database saved in the domain B being used to generate the authentication information, wherein the secret information server does not store the decrypted secret information database.

3. The authentication information generating system according claim 1 or 2, wherein the secret information server and the client apparatus perform communication through a secure channel established by mutual authentication.

4. The authentication information generating system according to claim 3, wherein the secure channel is established in accordance with authentication conducted when the client apparatus connects to the network.

5. An authentication information generating method of generating authentication information to be sent to a service providing apparatus on a network for user authentication, the method comprising:

a step, performed by a client apparatus used by a user, of sending user identification information to a secret information server on the network;

a step, performed by the secret information server, of confirming the validity of the user in accordance with the received user identification information and sending a secret information database decryption key of the user whose validity has been confirmed to the client apparatus of the user;

a step, performed by the client apparatus, of decrypting an encrypted secret information database stored in a secondary memory by using the received secret information database decryption key, saving the secret information database in a domain B of a main memory, which has a program execution environment mutually independent of that for a domain A of the main memory, where an application or a main OS is executed, and erasing the secret information database decryption key; and a step, performed by the client apparatus, of generating the authentication information by using the saved secret information database in the domain B, wherein the secret information server does not store the decrypted secret information database.

6. An authentication information generating method of generating authentication information to be sent to a service providing apparatus on a network for user authentication, the method comprising:

a step, performed by a client apparatus used by a user, of sending user identification information to a secret information server on the network;

a step, performed by the secret information server, of confirming the validity of the user in accordance with the received user identification information and sending to the client apparatus of the user whose validity has been confirmed, the encrypted secret information database of the user and the encrypted secret information database decryption key of the client apparatus;

a step, performed by the client apparatus, of decrypting the encrypted secret information database decryption key, received from the secret information server, by using a key specific to the client apparatus, stored in a secret information management unit which has a program execution environment mutually independent of that for a main memory, decrypting the encrypted secret information database, received from the secret information server, by using the secret information database decryption key, saving the secret information database in a domain B of the main memory, which has a program execution environment mutually independent of that for a domain A of the main memory, where an application or a main OS is executed, and erasing the secret information database decryption key and the encrypted secret information database decryption key; and a step, performed by the client apparatus, of generating the authentication information by using the saved secret information database in the domain B, wherein the secret information server does not store the decrypted secret information database.

* * * * *